Patented July 24, 1951

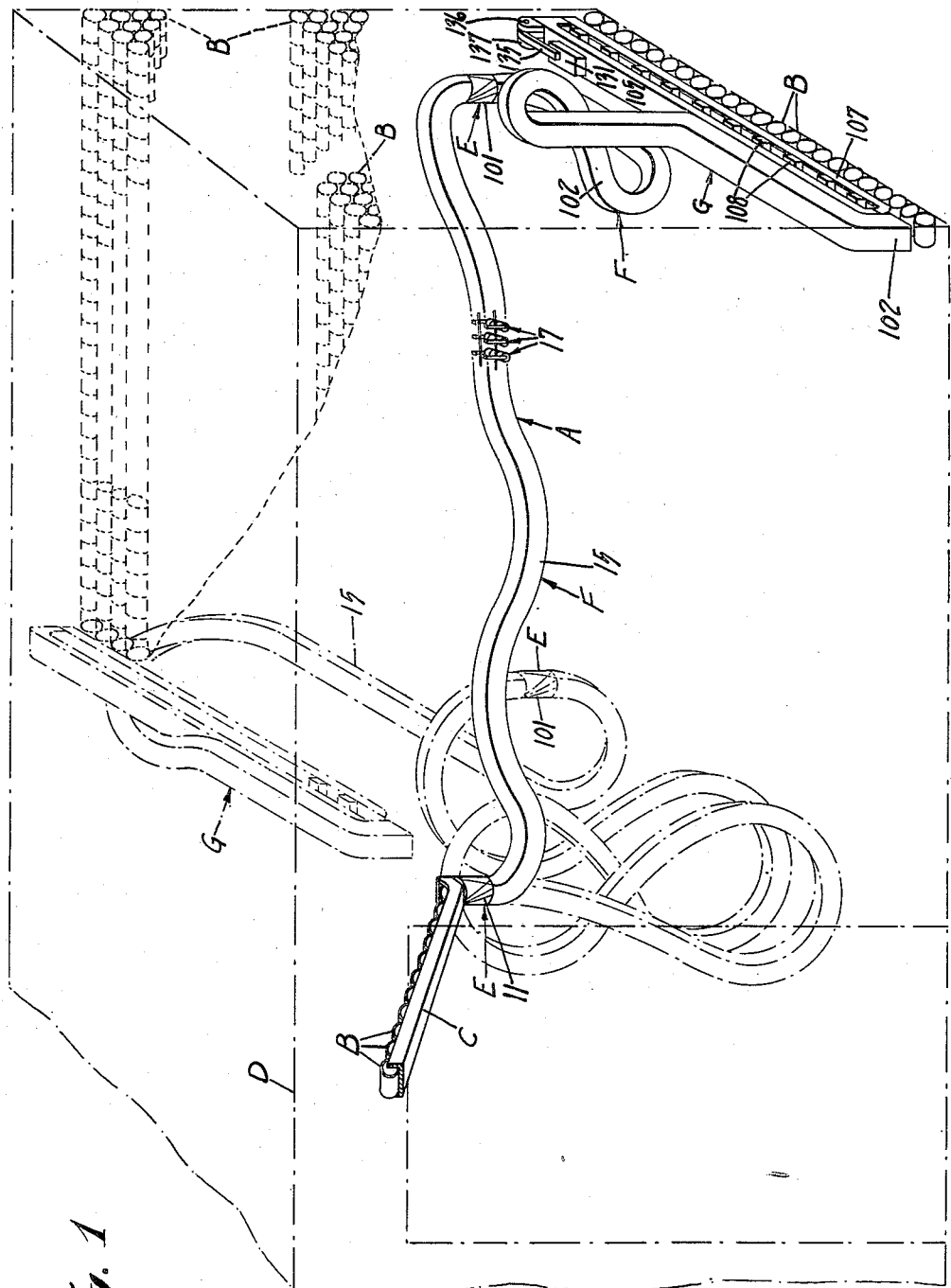

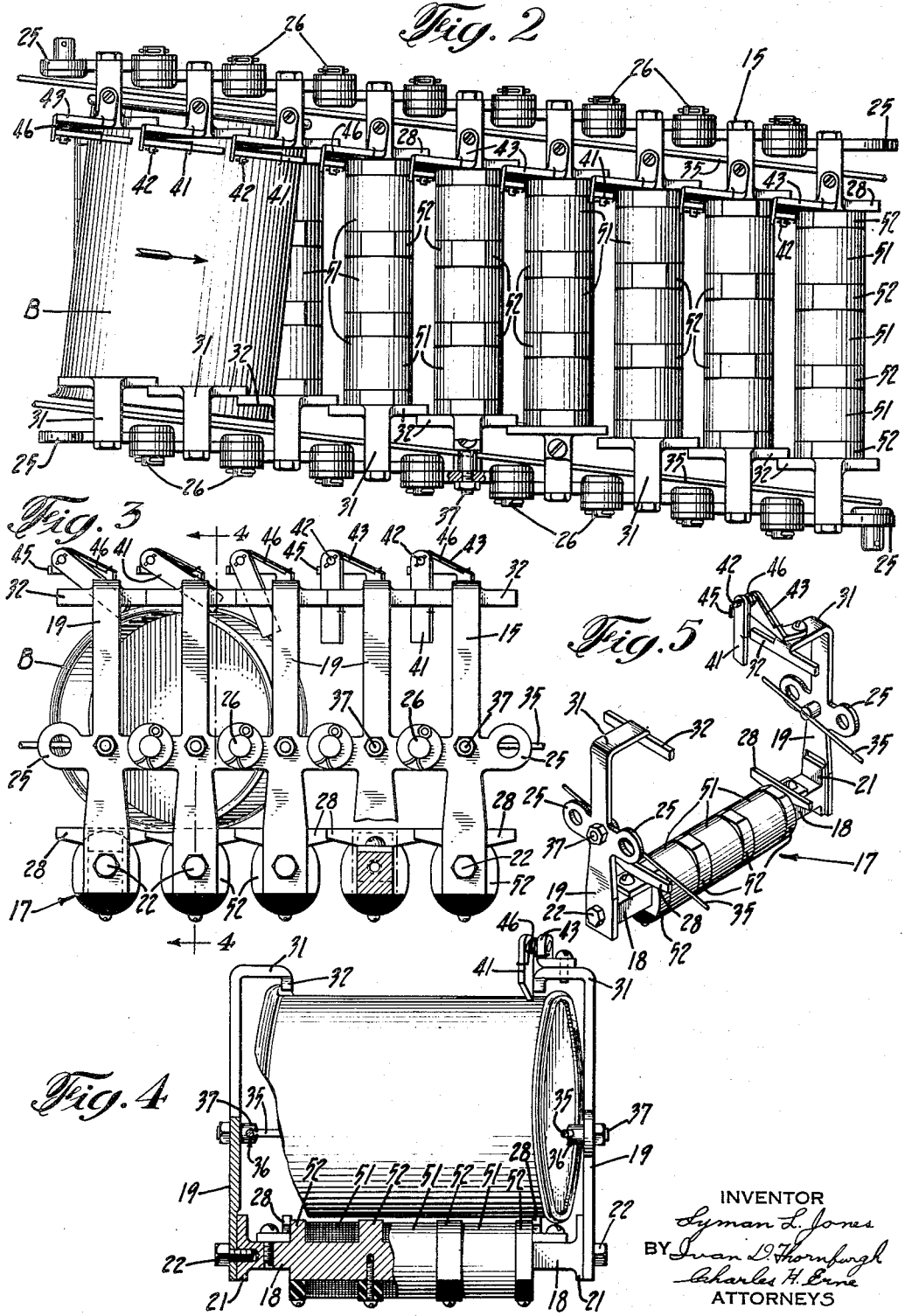

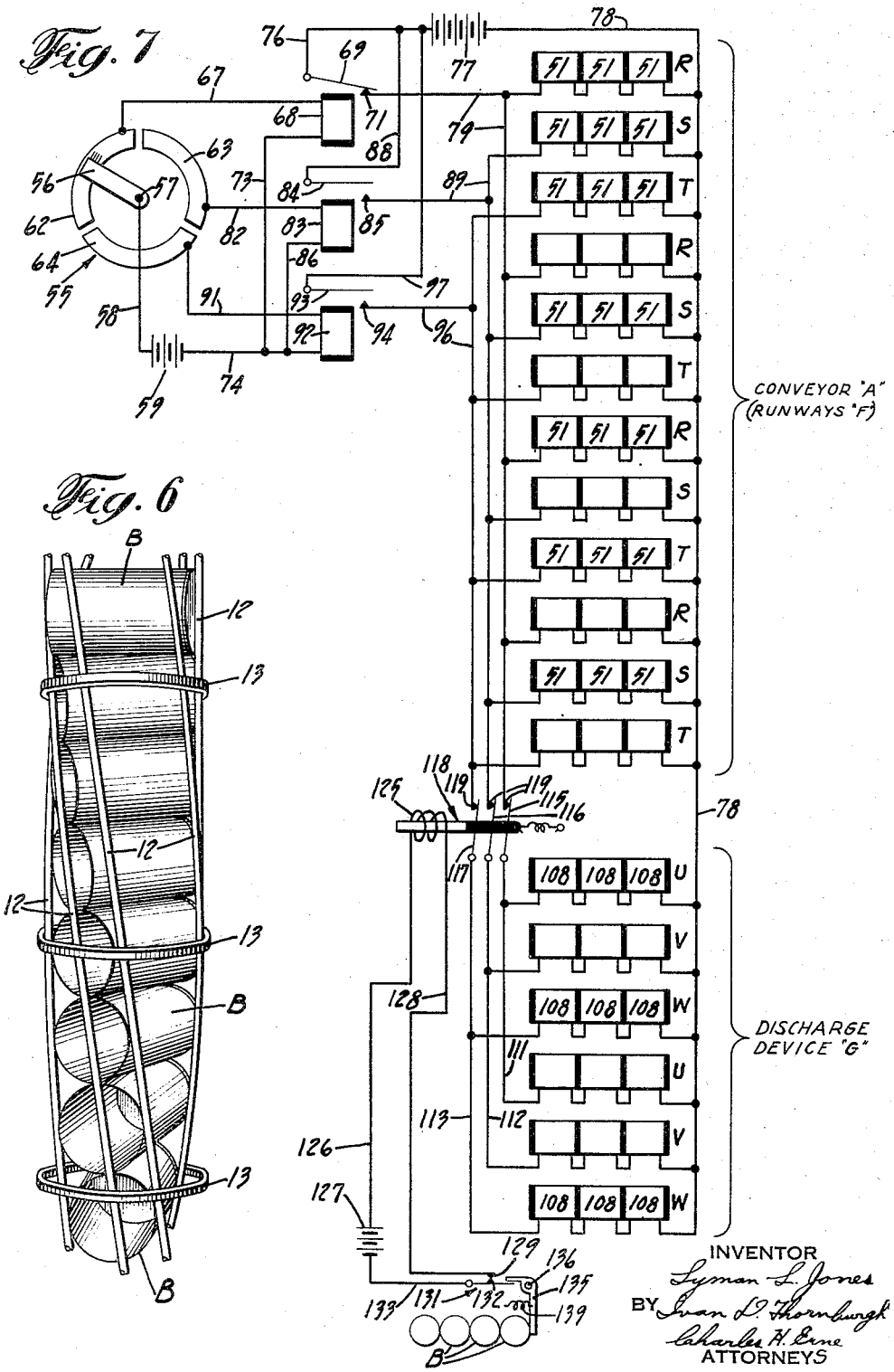

2,561,377

UNITED STATES PATENT OFFICE 2,561,377

CONVEYER MECHANISM FOR BULK LOADING CONTAINERS

Lyman L. Jones, Seattle, Wash., assignor to American Can Company, New York, N. Y., a corporation of New Jersey Application April 2, 1947, Serial No. 738,888

7 Claims. (Cl. 198—41)

The present invention relates to a conveyor mechanism for bulk loading sheet metal cans or containers or similar articles into railroad cars or storage bins or the like and has particular reference to a flexible conveyor which may be readily extended or contracted to reach a desired place of deposit for the cans.

An object of the invention is the provision of a conveyor mechanism for bulk loading of metal cans wherein the conveyor is flexible and may be folded into various degrees of compactness for guiding the cans to different loading positions so that the cans may be stacked in a uniform arrangement from the bottom to the top of a car or a bin and from one end of the car or bin to its opposite end irrespective of the flexure of the conveyor.

Another object is the provision of such a conveyor mechanism wherein the cans are propelled along the conveyor in processional order by electric devices carried by the conveyor so that a continuous flow of cans along the conveyor is insured irrespective of the flexure of the conveyor.

Another object is the provision of such a conveyor mechanism wherein the direction of travel of the cans may be changed as they travel through the mechanism so that the cans may readily roll along the conveyor irrespective of its flexure and so that they may be in a proper position for stacking upon delivery from the conveyor.

Another object is the provision of a delivery or discharge device for such a conveyor mechanism wherein the cans are collected in a predetermined arrangement, as for example in a continuous row or the like, before they are released so that the cans may be stacked uniformly in the receiving car or bin for storage.

Numerous other objects and advantages of the invention will be apparent as it is better understood from the following description, which, taken in connection with the accompanying drawings, discloses a preferred embodiment thereof.

Referring to the drawings:

Figure 1 is a schematic perspective view of a conveyor mechanism embodying the instant invention and in different positions incidental to bulk loading cans into a railroad car or bin, with parts broken away;

Fig. 2 is an enlarged top plan view of a portion of the conveyor, the view showing a can in place in the conveyor, with parts broken away;

Fig. 3 is a side elevation of the portion of the conveyor shown in Fig. 2; with parts broken away;

Fig. 4 is a sectional view taken substantially along the line 4—4 in Fig. 3;

Fig. 5 is a reduced scale perspective view of a runway unit of the conveyor;

Fig. 6 is an enlarged perspective view of a can twister portion of the conveyor for changing the direction of travel of the cans along the conveyor, with parts broken away; and Fig. 7 is a wiring diagram of the electric devices used in the conveyor.

As a preferred embodiment of the instant invention the drawings illustrate a flexible conveyor mechanism A (Fig. 1) for receiving sheet metal cans B from any suitable source of supply such as an inclined chute C leading from a can making machine, storage conveyor or the like and for propelling and guiding the cans into a desired bulk loaded position in a railroad freight car D for transportation or in a bin, room or other compartment for storage.

The conveyor mechanism preferably includes one or more conventional can twister units E for changing the direction of travel of the cans moving through the mechanism and a plurality of flexible conveyor runways F. The drawings show two such can twisters and two runways. One of the twisters is located between the chute C and the first runway F. The other twister is located between the two runways. The runways are foldable into various degrees of compactness in different predetermined directions for guiding the cans to selected loading positions. The delivery end of the conveyor mechanism is provided with a release or discharge device G.

The discharge device G through the flexibility of the conveyor runways F, is movable manually or in any other suitable manner for delivering and for arranging the cans in rows in a stacked order from the bottom of the car or bin to its top and from one end to the other so as to completely fill the compartment with a solid, orderly arranged mass of cans which may be readily kept in place during transportation or storage and which may be easily unloaded in an orderly manner.

If desired, the conveyor mechanism, by a mere reversal of operation of certain of its parts, may be used to unload the stacked cans in substantially the same manner in which they were so orderly loaded.

Cans B to be loaded into the room or compartment D roll on their sides in a horizontal position, down the inclined entrance chute C. This chute may be of any type suitable for guiding the cans in a rolling position into the compartment. Inside the compartment the rolling cans are received in a conventional twister unit 11 which is the first of the two twister units E, for changing the direction of travel of the cans so that they will be in position for rolling longitudinally of the compartment.

The conventional can twister unit 11 includes a plurality of spaced and parallel guide bars 12 (Fig. 6) which are connected to and which depend from the inner or delivery end of the entrance chute C. These bars are held together in proper spaced relation by a plurality of encircling rings 13 thus leaving a space at the middle of the unit through which the cans pass. The guide bars are curved from top to bottom so that as the cans fall through the unit, the bars guide them and twist them through an angle of ninety degrees. Thus cans discharged from the bottom of the unit are disposed with their axes at right angles to the axes of the cans entering the unit from the chute C and are in proper rolling position for travel longitudinally of the compartment.

The turned cans B as they leave the twister unit 11 enter into a flexible conveyor runway 15 which is the first of the conveyor runways F, for guidance longitudinally of the compartment. This conveyor runway 15 comprises a plurality of linked-together runway units 17 best shown in Fig. 5 of the drawings. Each runway unit 17 is U-shaped and includes a transverse bottom member 18 preferably made of magnetic material and a pair of upright side members 19 preferably made of non-magnetic material. The outer ends of the bottom member are formed with flat rectangular shaped heads 21 which are sunk into the side members 19, the latter being secured by screws 22 to the heads 21 (see also Fig. 4). The side members are thus held in spaced and parallel relation for the passage of the cans B therebetween.

A plurality of these runway units 17 are linked-together as above mentioned and thus form a continuous chain-like flexible conveyor runway. For this purpose each of the upright side members 19 of the units are formed with a pair of pierced ears 25 which are disposed intermediate the ends of the members. The ears of adjacent units overlap each other as best shown in Fig. 2 and are connected together by pivot pins 26 carried in the ear holes of the side members.

On one side of the resulting conveyor runway the ears 25 overlap on the outside and on the other side of the runway they overlap on the inside. This results in an offset relation of adjacent runway units 17 and provides an angularly formed conveyor runway which is readily foldable in one direction into various degrees of compactness. Preferably the conveyor runway is foldable into a series of adjacently disposed figure eights for compactness as shown in Fig. 1 in dot and dash lines or may be extended to its full length longitudinally of the compartment as shown in the same figure in full lines.

The cans B rolling along the runway are supported on flat narrow support blocks 28 which are secured to the bottom members 18 of the runway units 17. The support blocks of each unit overlap the support blocks of the adjacent units as best shown in Figs. 2 and 3 and thereby collectively provide a pair of spaced and parallel continuous support rails for the cans irrespective of the flexure of the conveyor section.

In order to prevent displacement of the cans B from the runway, the side members 19 of each unit 17 are bent inwardly at their upper ends (as viewed in Fig. 5) to provide overhanging retaining arms 31. The inner ends of these retaining arms are formed with elongated retaining shoes 32. The retaining shoes of each unit 17 overlap the shoes of the adjacent units in the same manner that the support blocks overlap and thereby collectively provide a pair of spaced and parallel continuous retaining rails for the cans irrespective of the flexure of the conveyor section.

Provision is also made for guiding the cans adjacent their ends as they roll through the runway. This end guiding of the cans is effected by a pair of spaced and parallel continuous flexible guide wires 35 (Figs. 2, 3, 4 and 5) which are located inside the conveyor adjacent the inner faces of the side members 19 of the runway units 17. The wires are secured in shallow grooves 36 (Fig. 4) formed in the inner ends of posts 37 carried in the side members 19. The posts 37 are disposed in alignment with the connecting center line of the pivot 26 so that the guide wires 35 will readily flex without distortion, with the conveyor runway it is folded and extended as an incident to its use as a conveyor of cans.

Cans rolling along the runway in a forward direction are prevented from falling backward, especially when the runway is folded in a manner to cause the cans to roll upwardly, by a plurality of stop dogs 41 which are disposed in the path of travel of the cans. There is one of these dogs for each runway unit 17. The outer ends of these dogs are mounted on pivot pins 42 carried in brackets 43 secured to the retainer arms 31 of the slide members 19 disposed along one side of the runway as best shown in Fig. 5. The inner ends of the dogs hang down into the path of travel of the cans and normally are held against a stop lug 45 of the brackets 43 by a wire spring 46 coiled around the pivot pins 42.

Hence as the cans roll along the runway they pass under the stop dogs 41 and readily swing the dogs out of the way. As soon as a can passes a dog, the dog snaps back behind the can, against its stop lug 45 and thus forms a rigid stop against which the can may come to rest in case it fails to continue its forward movement and tends to fall backward. It is in this manner that the cans are prevented from moving backward along the runway.

The cans B are rolled along the runway in spaced processional order by electromagnetic coils 51 carried on the bottom members 18 of the runway units 17 (see Figs. 4 and 5). There is a set of three of these coils connected in series on each bottom member 18. The coils are separately wound on the member between pole pieces 52 which are formed integrally with the member. It is for this reason that the bottom member of each runway unit 17 preferably is made of magnetic material while the side members are preferably made of nonmagnetic material.

The sets of magnet coils 51 are energized in a predetermined order or sequence so that the cans are rolled along the runway in a continuous motion by a traveling wave of magnetic attraction or flux created in the runway. For this purpose the sets of coils 51 of the runway units are divided into groups each of which comprise three sets of coils, i. e. nine coils in all. All of the sets of coils of the first runway unit of each group are connected together electrically and in parallel and are designated by the letter R as shown in the wiring diagram in Fig. 7. These sets of coils comprise every third set in the runway, i. e. the first, fourth, seventh, tenth, etc. sets continuing for the full length of the runway.

In like manner the second set of coils of each group of units are connected electrically in parallel and are designated by the letter S. These sets of coils comprise the second, fifth, eighth, eleventh, etc. sets. Similarly all the third sets of coils of each group, comprising the third, sixth, ninth, twelfth, etc. sets are connected electrically in parallel and are designated by the letter T.

Hence by energizing the sets of coils of each group consecutively, all of the sets R are energized simultaneously, then the sets S are energized simultaneously, and finally all the sets T are energized simultaneously. Thus a can B is first attracted by a set of coils R, then a set of coils S, then a set of coils T, then a set R, etc. for the full length of the runway and is thus propelled forward by this traveling wave of attraction as mentioned above. It is this substantially continuous advancing magnetic pull that causes the cans to roll along their support members 28 from one runway unit to the next and thus steadily travel along the runway irrespective of the flexure of the runway.

Due to the offset or overlapping relation of the runway units 17, the cans B travel through them at a slight angle to their magnets 51 as best shown in Fig. 2 and thus one end of each can comes under the magnetic pull of an advanced unit before the other end is entirely free of the unit just passed through. This overlapping of the magnets by the moving cans greatly assists in carrying them forward from one unit to the next.

Consecutive energization of the sets of magnet coils 51 in the runway 15 is brought about preferably by a conventional mechanical timer 55 such as a commutator or the like device schematically shown in the wiring diagram in Fig. 7. Such a timer as shown in the drawings includes a revolvable contact arm 56 which at its inner end is mounted on a rotatable shaft 57. The shaft is rotated in any suitable manner at a predetermined constant speed relative to the desired speed of travel of the cans along the runway. The contact arm is connected by a wire 58 to a suitable source 59 of electric current.

The outer end of the contact arm 56 engages against and travels along a plurality of commutator segments which surround the shaft 57 in spaced relation thereto and which in themselves are spaced apart and insulated from each other. The drawing shows three of these commutator segments, numbered 62, 63, 64. These segments are connected to one side of separate magnet relays having normally open switches for establishing electric circuits through the magnets 51 in the runway units 17 for energizing them consecutively as mentioned above.

In this arrangement of relays and magnets the segment 62 is connected by a wire 67 to one side of a relay 68 having a movable normally open switch element 69 and a fixed contact 71. The opposite side of the relay is connected by a wire 73 to a lead wire 74 which connects with the source 59 of electric current.

Hence while the revolving contact arm 56 is in engagement with the segment 62 electric current from the source 59 flows along wire 58, contact arm 56, segment 62, wire 67, into and through the relay 68 and returns to the source along wire 73. Current flowing along this circuit energizes the relay 68 and thus closes the movable switch element 69 against its contact 71 as shown in Fig. 7.

Closing of the switch element 69 establishes a magnet circuit which energizes the group R of magnets 51. For this purpose the switch element 69 is connected by a wire 76 to a source 77 of electric current separate from the source 59. The source 77 of current is connected also by a wire 78 to one side of all the sets of magnet coils 51 in all of the groups R, S, T of the runway units 17. The switch contact 71 is connected by a wire 79 to the other side of all of the sets of magnets in group R.

Hence as soon as the switch element 69 closes against its contact 71, the first, fourth, seventh, tenth, etc. groups of magnets 51 are simultaneously energized along the full extent or length of the runway as hereinbefore mentioned. These magnets remain energized for as long as the contact arm 56 of the timer 55 is in engagement with the segment 62. However at the normal high speed operation of the timer, this energizing of the magnets will be of a momentary nature to effect continuous rolling movement of the cans along the runway from one magnet to the next.

When the revolving contact arm 56 rides off the segment 62 and becomes engaged with the next segment 63, the relay circuit for the relay 68 is broken and hence the relay becomes deenergized. This permits the switch element 69 to open. Opening of this switch element breaks the magnet circuit serving the group R of magnets and hence these magnets become deenergized.

Engagement of the contact arm 56 with the segment 63 immediately establishes a relay circuit which includes a wire 82 connecting the segment with a relay 83. The relay has a movable normally open switch element 84 and a fixed contact 85. The opposite end of the relay is connected by a wire 86 to the wire 74 that leads to the source 59 of electric current. Establishment of this relay circuit energizes the relay 83 and closes its switch element 84.

Closing of this switch element 84 establishes a magnet circuit which includes the source 77 of electric energy and the second group S of magnets 51. For this purpose the switch element 84 is connected by a wire 88 to the source 77 of current while the fixed contact 85 is connected by a wire 89 to the group S of magnets 51.

In a similar manner the third segment 64 of the timer 55 is connected by a wire 91 to a third relay 92 having a movable normally open switch element 93 and a fixed contact 94.

The opposite side of the relay 92 is connected directly to the lead wire 74 of the source 59 of electric current. This relay 92 and switch element 93 control the remaining group T of runway magnets 51. This group T of magnets is connected by a wire 96 to the switch contact 94 while the switch element 93 is connected by a wire 97 to the source 77 of electric current.

Hence as the contact arm 56 of the timer 55 revolves continuously and passes over the different segments 62, 63, 64 in the order given, the respective relays 68, 83, 92 are consecutively energized momentarily and thus consecutively close their switch elements 69, 84, 93 momentarily. This consecutive closing of the switch elements momentarily energizes the coils of each group R, S, T, in rapid succession as hereinbefore mentioned for bringing about the creation of the traveling wave of magnetic flux which propels the cans along the runway.

Upon reaching the terminal end of the runway 15 the cans are delivered into a connecting twister unit 101 (Fig. 1) which is the second of the twister units E and which is similar to the first mentioned twister unit 11. The cans passing through this twister unit are turned relative to the vertical plane of their axes, through an angle of substantially ninety degrees. The cans are delivered in this position from the twister unit 101 and are immediately received in a flexible runway 102 (Fig. 1) which is the second of the runways F and which is connected to the exit end of the twister unit.

The runway 102 is similar in construction to the runway 15 just described and is composed of a plurality of runway units like the runway units 17 which permit of folding the runway into various degrees of compactness. This runway is foldable in a vertical direction so that the discharge device G may be readily shifted from the bottom to the top of the car or bin being loaded. This runway is also equipped with magnet coils like the magnet coils 51 and they are arranged in groups similar to the groups R, S, T, for creating a traveling wave of magnetic flux for propelling the cans through the runway. Energization of these magnet coils preferably is effected by connection with the timer 55 hereinbefore described.

Cans delivered from the terminal end of the runway 102 are received in the discharge device G. Such discharge device G is in the nature of a release mechanism for bringing a predetermined number of cans into a single row and when the required number is reached the cans are automatically released or discharged from any control of the operator handling the loading apparatus. Such a discharge device G may be of any suitable construction. A similar device, but one employing permanent magnets instead of the electro-magnets of the present invention, is illustrated and described in some detail in my co-pending application Serial No. 738,890, filed concurrently with the present invention, that is on April 2, 1947.

For the purposes of the present invention a simplified form of device G is illustrated. This discharge device comprises a movable frame which includes a horizontal support plate 105 (Fig. 1) preferably made of nonmagnetic material. This support plate carries the delivery end of the runway 102, the runway units being secured to the plate and extending substantially half-way around one end of the plate as shown in Fig. 1. The ends of the plate are formed with depending lugs 106 which carry a pair of spaced and parallel depending can rails 107 made of magnetic material. These rails serve as pole pieces for a plurality of electro-magnet coils 108 extending across the device from one rail to the other.

Hence cans moving through the terminal end of the runway 102 under the propelling power of its magnet coils, travel along the top and around one end of the discharge device G and are delivered onto the can rails 107. The can rails hold the cans in a suspended or depending position against the bottom edges of the rails. This suspension of the cans is brought about by the magnet coils 108.

The coils 108 also propel the cans with a rolling action along the rails toward the opposite ends of the rails. For this purpose the coils 108 are arranged in groups U, V, W (Fig. 7) in a manner similar to the arrangement of the runway magnet groups R, S, T, hereinbefore described and are energized and deenergized by the timer 55.

By referring to the wiring diagram in Fig. 7 it will be seen that one side of these groups of coils 108 is connected to the lead wire 78 of the runway coils 51. Thus this one wire serves all of the coils. On the opposite side, the coils of the different groups U, V, W are connected respectively into lead wires 111, 112, 113. The wires 111, 112, 113 are connected respectively to movable elements 115, 116, 117 of a normally closed electric switch 118. These elements engage against contacts 119 connected with the lead wires 79, 89, 96.

Thus when the switch 118 is closed, the discharge device coils 108 are momentarily energized in the same consecutive order and in the same timed relation, as and with, the magnet groups R, S, T of the runways, the timer 55 controlling this energizing of all of the runway and discharge device coils. Thus an independent traveling wave of magnetic flux is set up in the discharge device and this wave continues the rolling of the cans along the can rails 107 as they are delivered from the terminal end of the runway 102.

The cans rolling along the can rails 107 are in a straight row, ready for deposit in the compartment or room being loaded. In this position and when the rails are filled with a continuous row of cans, the entire row is dropped as a unit from the discharge device into the desired place in the compartment. This is brought about by the opening of the line switch 118 which thus deenergizes all of the coils in all of the groups U, V, W simultaneously and thus releases the cans from the rails 107.

The switch 118 is actuated by a solenoid relay 125 (Fig. 7), one end of which is connected by a wire 126 to a source 127 of electric current. The other end of the solenoid is connected by a wire 128 to a stationary contact 129 of a normally closed electric release switch 131 having a movable element 132 connected by a wire 133 to the source 127 of current. As long as the release switch 131 remains closed, the solenoid relay 125 remains energized and thus the line switch 118 remains closed. However the opening of the release switch 131 immediately breaks the relay circuit and thus opens the line switch 118 to release the cans from the rails 107.

The opening of the release switch 131 is effected by a bell crank release lever 135 (Figs. 1 and 7) which is located at the terminal end of the can rails 107. This lever is mounted on a pivot pin 136 carried in bearing blocks 137 formed on the support plate 105 of the discharge device frame. One arm of the lever engages against the movable element 132 of the release switch 131, this switch being mounted on the support plate 105. The other arm of the lever hangs down adjacent the terminal end of the can rails 107 and projects into the path of travel of the cans rolling along the rails. The lever is held in position by a tension spring 139, one end of which is connected to the depending arm of the lever and the other end to the support plate 105.

Hence when the cans rolling along the can rails 107 completely fills the rails from end to end in a solid row as best shown in Fig. 1, the first can in the row engages the depending arm of the release lever 135 and shifts it outwardly against the tension of its spring 139. This rocks the lever on its pivot pin 136 and thus presses against the movable element 132 of the release switch 131. The release switch is thereby opened, and the circuits connecting with the magnet coils 108 are thereby broken as explained above. It is in this manner that the row of cans on the discharge device G is released for deposit in the compartment to be loaded.

As soon as a row of cans is released from the can rails 107, the release lever 135 shifts back into its original position under the tension of its spring 139 and the release switch 131 is thereby closed. Hence the magnet coil circuits are immediately restored and the coils again function to roll the following cans into position to form a new row of cans in the device for release as just explained. The deenergizing of the coils to release the cans is of a momentary nature and in no way interferes with the progress of the cans rolling along the runways 15, 102 toward the discharge device.

For loading cans into railroad cars, the discharge device G preferably is made of a length slightly shorter than the width of the car. With such a discharge device a row of cans long enough to fill the space between the side walls of the car may be assembled at one time. Hence by proper manipulation of the discharge device, rows of cans may be rapidly built-up, one on top of the other, until the car is filled from bottom to top. Fig. 1 shows the starting position of the discharge device (in full lines) in building up such a stack. By tilting the device slightly forward as the rows are stacked one on top of the other, the flanges of the cans may be interlocked to keep the cans in place.

When a full height stack, one row deep, has been formed, the discharge device is moved back to the floor of the car for the starting of a second stack immediately adjacent the first stack. By repetition of this process the entire car, excepting that portion adjacent the car door which is left empty for entrance into the car, may be solidly packed with cans for transportation. In dot and dash lines in Fig. 1, the discharge device is shown in its final position in filling a car with the cans.

The same process may be effected when loading cans into a bin, room or other storage compartment. In thus bulk loading a car or bin with cans, the discharge device G is shifted vertically for the full height of the compartment and also longitudinally for its full length. This movement of the discharge device is made possible by the flexible runways 15, 102 hereinbefore explained, the runways being foldable in their designated directions for best manipulation of the discharge device.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A conveyor for bulk loading of metal cans or the like, comprising in combination a flexible runway formed with a plurality of interconnected units foldable into various degrees of compactness by changing the relative positions of adjacent units for guiding cans to different loading positions, a plurality of electric coils each coil carried by each unit of said runway said coils being arranged in groups with the same number of coils in each group, timer means for energizing corresponding coils of each group simultaneously and the different coils of each group consecutively for rolling the cans in processional order through the runway, a movable discharge member on one end of said runway for receiving the cans therefrom, a plurality of electric coils carried by said discharge member and arranged in groups of an equal number of coils in each group the coils in each group being energized simultaneously and the different coils of each group consecutively by said timer means for continuing the rolling of the cans along said discharge member for discharging them at the desired loading positions irrespective of the flexure of the runway.

2. A conveyor for bulk loading of metal cans or the like, comprising in combination a flexible runway formed with a plurality of pivotally connected units foldable by movement of adjacent units on their pivots into various degree of compactness for guiding cans of different loading positions, a plurality of electric coils carried by the units of said runway and arranged in groups with the same number of coils in each group, timer means for energizing corresponding coils of each group simultaneously and the different coils of each group consecutively for rolling the cans in processional order through the runway, a movable discharge member on one end of said runway for receiving cans therefrom, a plurality of electric coils carried by said discharge member and arranged in groups with the same number of coils in each group the coils in each group being energized simultaneously and the different coils of each group consecutively by said timer means for continuing the rolling of the cans along said discharge member for discharging them at the desired loading positions irrespective of the flexure of the runway, and electric means operable by the cans collected on said discharge member for deenergizing the electric coils on said member for releasing the collected cans as a unit.

3. A conveyor for bulk loading of metal cans or similar articles, comprising in combination a plurality of runway units linked together and forming a continuous flexible runway foldable into various degrees of compactness for guiding cans to different loading positions, each runway unit including a bottom member and a pair of side members, support blocks formed on said bottom members and collectively providing a continuous support for cans in said runway irrespective of the flexure of the runway, and electric means secured to each of said runway units for propelling the cans in processional order through the runway for discharging them at the desired loading positions irrespective of the flexure of the runway.

4. A conveyor for bulk loading of metal cans or similar articles, comprising in combination a plurality of runway units linked together and forming a continuous flexible runway foldable into various degrees of compactness for guiding cans to different loading positions, said runway units each including a bottom member and a pair of side members, support blocks formed on said bottom members and collectively providing a continuous support for cans in said runway irrespective of the flexure of the runway, retaining shoes formed on said side members and spaced from said support blocks for maintaining the cans in the runway and against said support blocks irrespective of the flexure of the runway, and electric means secured to the bottom members of said runway units for propelling the cans in processional order through the runway for discharging them at the desired loading positions irrespective of the flexure of the runway.

5. A conveyor for bulk loading of metal cans or the like, comprising in combination a plurality of runway units linked together and forming a continuous flexible runway foldable into various degrees of compactness for guiding cans to different loading positions, each runway unit including a bottom member and a pair of side members, support blocks formed on said bottom members and collectively providing a continuous support rail for cans in said runway irrespective of the flexure of the runway, electric means secured to the bottom members of said runway units for propelling the cans in processional order through the runway for discharging them at the desired loading positions irrespective of the flexure of the runway, and stop dogs carried on the side members of said runway units for engaging behind each can as it passes through said runway for holding it against backward travel through the runway.

6. A conveyor for bulk loading of metal cans or the like, comprising in combination a plurality of runway units linked together and forming a continuous flexible runway foldable into various degrees of compactness for guiding cans to different loading positions, each runway unit including a bottom member and a pair of side members, support blocks formed on said bottom members and collectively providing a continuous support for cans in said runway irrespective of the flexure of the runway, electric means secured to the bottom members of said runway units for propelling the cans in processional order through the runway for discharging them at the desired loading positions irrespective of the flexure of the runway, and a continuous flexible guide wire secured to the side members of said runway units adjacent their inner faces and in alignment with the link connections of said units for guiding said cans through said runway irrespective of the flexure of the runway.

7. A conveyor for bulk loading of metal cans and the like, comprising in combination a plurality of runway units linked together and forming a continuous flexible runway foldable into various degrees of compactness for guiding cans to different loading positions, said runway units including a bottom member and a pair of side members, said side members having projecting ears pivotally connected for linking the units together, corresponding ears of each unit being overlapped in the same relation and off-setting adjacent units in an angular arrangement for guiding the cans through the runway at an angle to the bottom members of said units, and electric means secured to the bottom members of said runway units for propelling the cans in processional order through the runway for discharging them at the desired loading positions irrespective of the flexure of the runway.

LYMAN L. JONES.

REFERENCES CITED

The following references are of record in the file of this patent:

UNITED STATES PATENTS

| Number | Name | Date |
|---|---|---|
| 282,165 | Cheever | July 31, 1883 |
| 384,775 | Mengis | June 19, 1888 |
| 714,851 | Albertson | Dec. 2, 1902 |
| 1,020,942 | Bachelet | Mar. 19, 1912 |
| 1,487,634 | Waters | Mar. 18, 1924 |
| 1,686,129 | Fullips | Oct. 2, 1928 |
| 1,886,896 | Nelson | Nov. 8, 1932 |
| 2,015,809 | Moore | Oct. 1, 1935 |
| 2,312,357 | Odquist et al. | Mar. 2, 1943 |
| 2,419,315 | Elliott | Apr. 22, 1947 |
| 2,445,960 | Mapes | July 27, 1948 |